(12) United States Patent
Zanpure et al.

(10) Patent No.: US 11,461,312 B2
(45) Date of Patent: Oct. 4, 2022

(54) METHOD AND SYSTEM FOR PERFORMING ADAPTIVE CONSENSUS IN A DISTRIBUTED LEDGER NETWORK

(71) Applicant: WIPRO LIMITED, Bangalore (IN)

(72) Inventors: Chaitanya Rajendra Zanpure, Pune (IN); Shivam Mishra, Ghaziabad (IN)

(73) Assignee: Wipro Limited, Bangalore (IN)

( * ) Notice: Subject to any disclaimer, the term of this patent is extended or adjusted under 35 U.S.C. 154(b) by 122 days.

(21) Appl. No.: 16/835,222

(22) Filed: Mar. 30, 2020

(65) Prior Publication Data

US 2021/0303553 A1 Sep. 30, 2021

(30) Foreign Application Priority Data

Mar. 28, 2020 (IN) .............................. 202041013728

(51) Int. Cl.
  *G06F 16/23* (2019.01)
  *H04L 9/00* (2022.01)
  *H04L 9/32* (2006.01)

(52) U.S. Cl.
  CPC ...... *G06F 16/2379* (2019.01); *G06F 16/2365* (2019.01); *H04L 9/50* (2022.05)

(58) Field of Classification Search
  CPC .............. G06F 16/2379; G06F 16/2365; H04L 2209/38
  See application file for complete search history.

(56) References Cited

U.S. PATENT DOCUMENTS 10,521,311 B1 * 12/2019 Greenwood ......... G06F 11/2028
10,944,812 B1 *  3/2021 Veppumthara ...... H04L 67/1002
(Continued)

FOREIGN PATENT DOCUMENTS

KR      102050087 B1   11/2019
WO    2019147295 A1    8/2019
(Continued)

OTHER PUBLICATIONS

Kessler, "An Overview of Cryptography" https://www.garykessler.net/library/crypto.html; 1998-2022, p. 51 (Year: 1998).*
(Continued)

*Primary Examiner* — Dennis Truong
(74) *Attorney, Agent, or Firm* — Finnegan, Henderson, Farabow, Garrett & Dunner, LLP

(57) ABSTRACT

A method and system for performing adaptive consensus in a distributed ledger network are disclosed. The method includes identifying a selector node from plurality of nodes within distributed ledger network, based on random selection algorithm. The method includes adaptively selecting set of consensus nodes from plurality of nodes based on set of predefined node parameters and plurality of sensitivity parameters to create an unverified block in a ledger of each of adaptively selected set of consensus nodes. The method includes computing hash value for each of at least one new transaction in distributed ledger network. The method includes performing consensus based on computed hash value for identifying set of valid transactions in unverified blocks created by each of adaptively selected set of consensus nodes. The method includes creating verified block including set of valid transactions, and commits verified block to distributed ledger in distributed ledger network.

20 Claims, 6 Drawing Sheets

(56) References Cited

U.S. PATENT DOCUMENTS

| | | | |
|---|---|---|---|
| 2016/0019125 A1* | 1/2016 | Madduri | G06F 11/1425 |
| | | | 714/4.11 |
| 2017/0048217 A1* | 2/2017 | Biggs | H04L 63/0435 |
| 2018/0121909 A1* | 5/2018 | Christidis | H04L 9/3236 |
| 2018/0343126 A1* | 11/2018 | Fallah | H04L 9/30 |
| 2019/0068380 A1* | 2/2019 | Tang | H04L 9/3265 |
| 2019/0207759 A1* | 7/2019 | Chan | H04L 9/0637 |
| 2019/0287099 A1* | 9/2019 | Tan | G06F 16/2379 |
| 2019/0356674 A1* | 11/2019 | Irazabal | H04L 63/12 |
| 2019/0394267 A1* | 12/2019 | Bistram | H04L 67/1059 |
| 2020/0112443 A1* | 4/2020 | Todd | H04L 9/14 |
| 2020/0112545 A1* | 4/2020 | Smith | H04L 63/04 |
| 2020/0250655 A1* | 8/2020 | Naqvi | G06Q 20/3674 |
| 2020/0250747 A1* | 8/2020 | Padmanabhan | G06N 5/04 |
| 2020/0394176 A1* | 12/2020 | Wu | G06F 16/22 |
| 2020/0403776 A1* | 12/2020 | Oh | H04L 9/3239 |
| 2021/0064763 A1* | 3/2021 | Sanghvi | G06N 20/00 |
| 2021/0234698 A1* | 7/2021 | Li | H04L 67/16 |

FOREIGN PATENT DOCUMENTS

| | | | | |
|---|---|---|---|---|
| WO | 2019243816 A1 | 12/2019 | | |
| WO | WO-2020120933 A1 * | 6/2020 | | G06F 16/2379 |

OTHER PUBLICATIONS

Ebrahim et al. "Symmetric Algorithm Survey: A Comparative Analysis"; International Journal of Computer Applications (0975-8887) vol. 61—No. 20, Jan. 2013 (Year: 2013).*

Aydar, Mehmet, et al. "Private key encryption and recovery in blockchain." arXiv preprint arXiv:1907.04156 (2019). (Year: 2019).*

\* cited by examiner

METHOD AND SYSTEM FOR PERFORMING ADAPTIVE CONSENSUS IN A DISTRIBUTED LEDGER NETWORK

TECHNICAL FIELD

This disclosure relates generally to distributed ledger networks and more particularly to method and system for performing adaptive consensus in a distributed ledger network.

BACKGROUND

A distributed ledger network provides means for decentralized and secure data storage. Examples of a distributed ledger network may include, but are not limited to Hyperledger, Blockchain, Directed Acyclic Graphs (DAG), Holochain, Hashgraph, Tangle, and Lattice. However, it is impossible for any distributed ledger to simultaneously satisfy three properties, i.e., cost efficiency, decentralization, and correctness in entirety. In particular, decentralization has three main costs, which include wastage of resources, scalability problems, and network externality inefficiencies. Further, to satisfy the correctness property, consensus algorithms are used in distributed ledger networks. In conventional systems, consensus algorithms lead to unfair selection of nodes that actually create a block in a distributed ledger. Thus, if such unfair selection of nodes exists in the distributed ledger network, the whole underlying essence of the distributed ledger technology is defeated and the distributed ledger is no longer trustworthy.

In a complex distributed ledger network, each node needs to validate and update each transaction in a local copy of the distributed ledger, using a consensus mechanism. In conventional systems, each node is required to solve a cryptographic puzzle within a pre-defined time period (for example, 10 mins for Bitcoins). Each node tries to solve the cryptographic puzzle within the pre-defined time and the node which solves the cryptographic puzzle first is chosen as the leader and subsequently writes a new block to the distributed ledger. However, a complex distributed ledger network is likely to have nodes with unequal abilities (such as computing power, algorithm efficiency, etc.) for solving such puzzles. This may lead to issues, such as, bias in transaction execution and resource wastage. In case of bias in transaction execution, there is high possibility of a node having high capability in terms of resources getting selected as leader node repeatedly. This may lead to bias on transaction control. With regards to resource wastage, nodes having lower capability have less chances of being selected and such nodes keep on performing computation to solve the puzzle irrespective of the leader node being selected, which may lead to resource wastage.

Further, the distributed ledger network needs to prove that they can offer the scalability, speed and security required for any proposed use cases. Research efforts on distributed consensus algorithms, which are crucial to achieving these objectives, are still ongoing, however a solution that combines all desired characteristics cannot yet be achieved without significant trade-offs. Some consensus algorithms are more mature and secure, but on the other hand are also slow and very energy intensive. As a result, developers are increasingly moving towards advanced consensus schemes that are energy efficient, faster and more scalable. Other promising solutions include techniques such as 'sharding' that enable parallel processing. Often these solutions may come, at the expense of security and centralisation. Early adopters of such technologies face the challenge of selecting the right consensus mechanism and system architecture, without having a clear long-term picture of the advantages and downsides that each approach has to offer.

The whole idea of the distributed ledger network technology is decentralization and a fight against the monarchy. However, if a hacker invests into high computational power and becomes a miner who is controlling the distributed ledger network then the hacker can block other miners from creating the new blocks. Consider a scenario where "Alice" is sending "Bob" some cryptocurrency through the distributed ledger network. However, "Alice" is involved in the attack, and "Bob" is not. The transaction takes place, but the attackers don't let any amount of money to be transferred by starting a fork in the chain. In other cases, the miners will join up in one of the branches. They will have the most computational power combined on those blocks. That's why other blocks with shorter life get rejected. As a result, "Bob" won't receive the money and thus the blockchain decentralized architecture goes for a toss.

In view of the above, conventional distributed ledger networks are inherently bound to be computationally inefficient requiring massive processing power and network energy. Although not intended by the original creators, conventional distributed ledger networks have become rapidly centralized and undemocratic because of the inherent flaws in the current block consensus techniques. The current block consensus techniques favor network nodes with larger computing resources, which, over time will exponentially increase centralization and foster non-democratization, which is not desirable.

Thus, conventional methods and systems for building consensus in distributed ledger fail to address issues of fairness and resource wastage issues for leader node selection. There is therefore a need for an appropriate consensus mechanism that is able to ensure an unbiased (or fair) selection of a leader node in a distributed ledger network, while minimizing resource wastage.

SUMMARY

In one embodiment, a method for performing adaptive consensus in a distributed ledger network is disclosed. The method includes identifying, by one of a plurality of nodes in the distributed ledger network, a selector node from the plurality of nodes within the distributed ledger network, based on a random selection algorithm. The method further includes adaptively selecting, by the selector node, a set of consensus nodes from the plurality of nodes based on a set of predefined node parameters and a plurality of sensitivity parameters to create an unverified block in a local ledger of each of the adaptively selected set of consensus nodes. The unverified block includes at least one new transaction in the distributed ledger network. The method further includes computing, by each of the adaptively selected set of consensus nodes, a hash value for each of the at least one new transaction in the distributed ledger network. The method further includes performing, by each of the adaptively selected set of consensus nodes, consensus based on the computed hash value for identifying a set of valid transactions in the unverified blocks created by each of the adaptively selected set of consensus nodes. The method further includes creating, by a consensus node from the adaptively selected set of consensus nodes, a verified block including the set of valid transactions. The consensus node identifies the set of valid transactions in a shortest time when compared with remaining consensus nodes in the adaptively selected set of consensus nodes. The method further includes committing, by the consensus node, the verified block to a distributed ledger in the distributed ledger network.

In one embodiment, a system for performing adaptive consensus in a distributed ledger network is disclosed. In one example, the system may include a processor and a computer-readable medium communicatively coupled to the processor. The computer-readable medium may store processor-executable instructions, which, on execution, cause the processor to identify a selector node from the plurality of nodes within the distributed ledger network, based on a random selection algorithm. The processor-executable instructions, on execution, further cause the processor to adaptively select a set of consensus nodes from the plurality of nodes based on a set of predefined node parameters and a plurality of sensitivity parameters to create an unverified block in a local ledger of each of the adaptively selected set of consensus nodes. The unverified block includes at least one new transaction in the distributed ledger network. The processor-executable instructions, on execution, further cause the processor to compute a hash value for each of the at least one new transaction in the distributed ledger network. The processor-executable instructions, on execution, further cause the processor to perform consensus based on the computed hash value for identifying a set of valid transactions in the unverified blocks created by each of the adaptively selected set of consensus nodes. The processor-executable instructions, on execution, further cause the processor to create a verified block comprising the set of valid transactions. The consensus node identifies the set of valid transactions in a shortest time when compared with remaining consensus nodes in the adaptively selected set of consensus nodes. The processor-executable instructions, on execution, further cause the processor to commit the verified block to a distributed ledger in the distributed ledger network.

In yet another embodiment, a non-transitory computer-readable medium storing computer-executable instructions for performing adaptive consensus in a distributed ledger network is disclosed. In one example, the stored instructions, when executed by a processor, cause the processor to perform operations including identifying a selector node from the plurality of nodes within the distributed ledger network, based on a random selection algorithm. The operations further include adaptively selecting a set of consensus nodes from the plurality of nodes based on a set of predefined node parameters and a plurality of sensitivity parameters to create an unverified block in a local ledger of each of the adaptively selected set of consensus nodes. The unverified block includes at least one new transaction in the distributed ledger network. The operations further include computing a hash value for each of the at least one new transaction in the distributed ledger network. The operations further include performing consensus based on the computed hash value for identifying a set of valid transactions in the unverified blocks created by each of the adaptively selected set of consensus nodes. The operations further include creating a verified block including the set of valid transactions. The consensus node identifies the set of valid transactions in a shortest time when compared with remaining consensus nodes in the adaptively selected set of consensus nodes. The operations further include committing the verified block to a distributed ledger in the distributed ledger network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
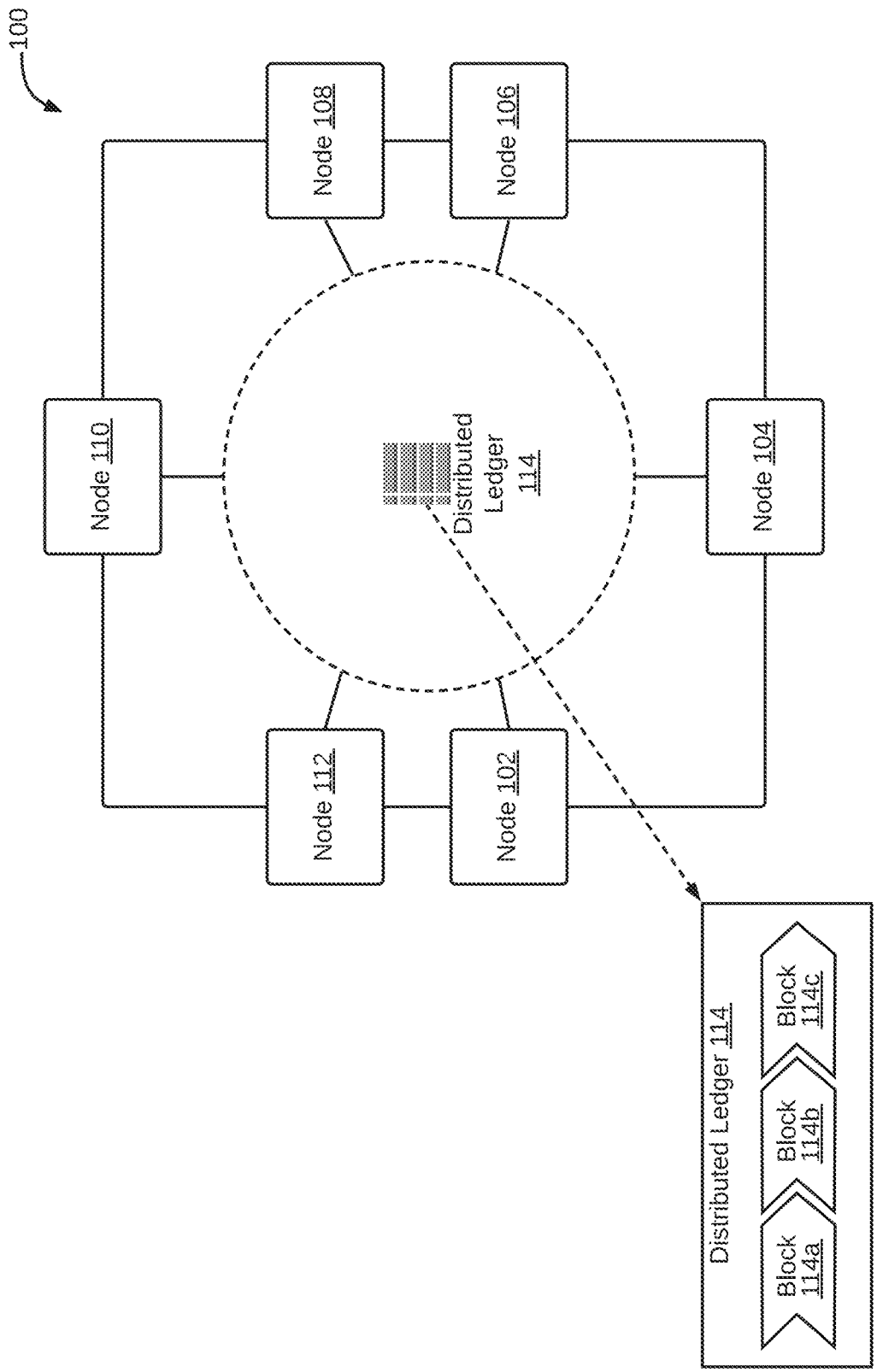
FIG. 1 illustrates a distributed ledger network in which various embodiments may be employed.

Additional illustrative embodiments are listed below. In one embodiment, a distributed ledger network 100, in which various embodiments may be employed, is illustrated in FIG. 1. It will be apparent to a person skilled in the art that the invention is not limited to the distributed ledger network 100 and is relevant to all variations and implementations of the distributed ledger network 100, for example, Blockchain network, Hyperledger, Directed Acyclic Graphs (DAG), Holochain, Hashgraph, Tangle, Lattice, and the like.

The distributed ledger network 100 also includes a plurality of computing nodes, for example, a node 102, a node 104, a node 106, a node 108, a node 110, and a node 112. It will be apparent to a person skilled in the art that each of the plurality nodes are technically similar to each other and only differ byway of the performed functionalities. Each of the plurality of nodes is capable of running one or more applications and establishing communication with other computing nodes. Examples of nodes may include, but are not limited to a computer, a smart phone, a Personal Digital Assistant (PDA), a laptop, a tablet and so forth.

In order to initiate a transaction, the node 102 uses cryptographic tools to digitally sign a proposed update to a distributed ledger 114 (which is shared as a copy with each of the plurality of computing nodes). It may be noted that the distributed ledger 114 may be a database of sequential blocks that record state of each transactions in the distributed ledger network 100. As depicted in FIG. 1, the distributed ledger 114 includes a set of blocks 114a, 114b, and 114c, each of which is immutable. A block may include a plurality of transactions received within a predefined time interval. However, a new block is not committed to the distributed ledger 114 unless a consensus algorithm is executed. Upon obtaining a consensus, the distributed ledger 114 is updated with the new block.

In an exemplary scenario, the transaction may correspond to a payment transaction. In such a scenario, the distributed ledger 114 may be used for transferring funds from an account on the distributed ledger 114 to an account associated with an entity owning a receiver node (one of the plurality of computing nodes). Upon receiving the transfer request, each of the plurality of nodes may authenticate identity of a sender node and may validate the transaction by checking that the sender node has necessary cryptographic credentials to make an update to the distributed ledger 114. Validation of the transaction may also include verifying whether the sender computing node has sufficient funds to make the payment and fulfill the transaction. Further, validation of the transaction may include obtaining a consensus (majority approval) from the plurality of nodes regarding validity of the transaction using the disclosed adaptive consensus technique as disclosed herein. Upon obtaining the consensus, one of the plurality of nodes may create a verified block including the transaction and add the verified block to the copy of the distributed ledger 114 associated with the one of the plurality of computing nodes. Further, the copy of the distributed ledger 114 associated with the one of the plurality of nodes may be broadcasted within the distributed ledger network 100.

In an embodiment, some of the plurality of nodes in the distributed ledger network 100 at a particular time may be at least one of a selector node, a consensus node, and a validator node. The selector node may adaptively select a set of consensus nodes for creating a verified block in the distributed ledger 114 based on a plurality of predefined node parameters and sampling. The consensus node may create a new verified block based on the consensus of the adaptively selected set of consensus nodes. The validator node may validate each block before committing the block to the distributed ledger 114. This is further explained in detail in conjunction with FIG. 2 to FIG. 6.

Figure 2:
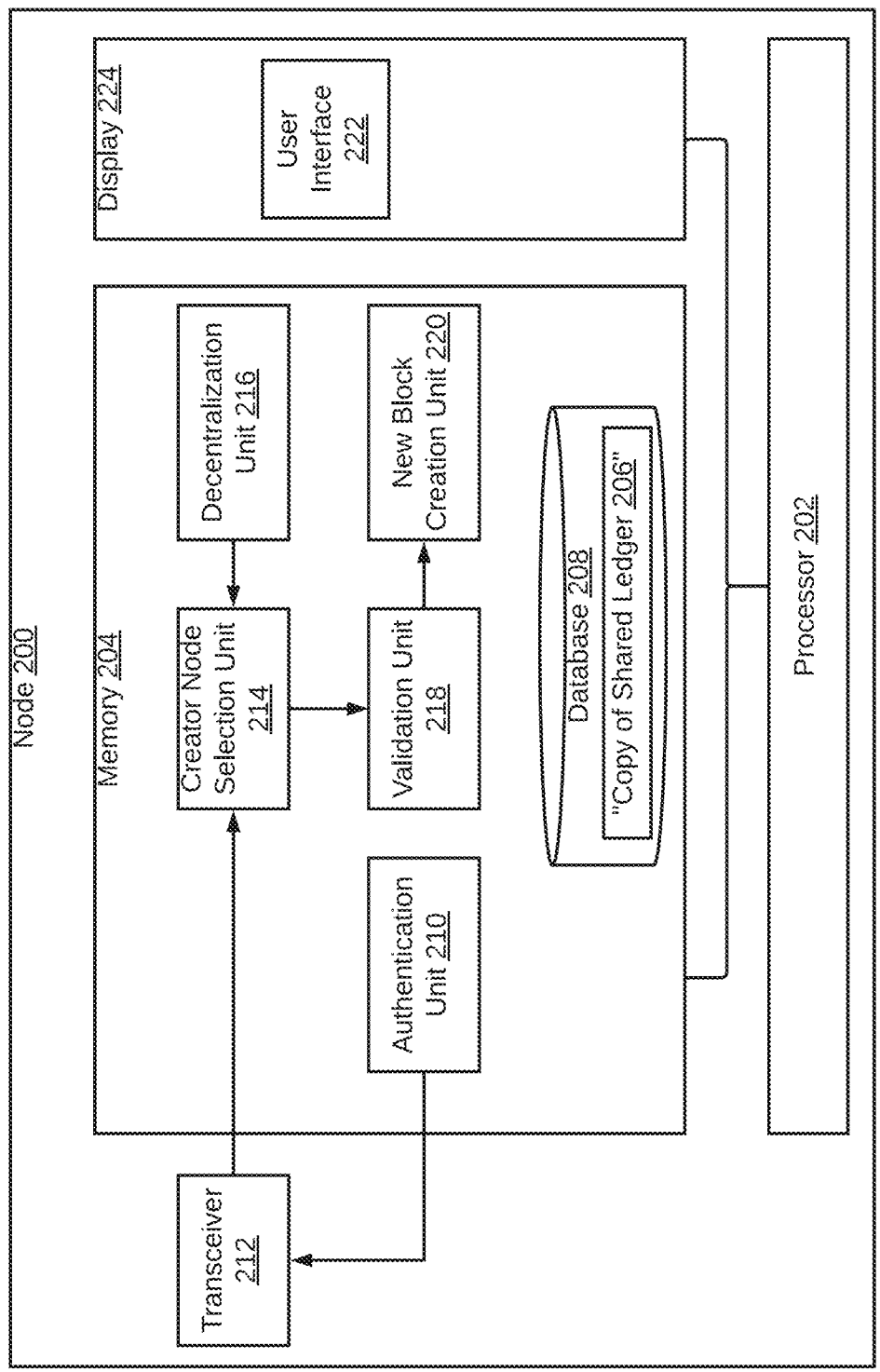
FIG. 2 illustrates a block diagram of a node in the distributed ledger network that is configured to perform adaptive consensus in a distributed ledger network, in accordance with an embodiment.

Referring now to FIG. 2, a block diagram of a node 200 of the distributed ledger network 100 that is configured to perform adaptive consensus in the distributed ledger network 100 is illustrated, in accordance with an embodiment. The node 200 may be analogous to each of the plurality of nodes 102, 104, 106, 108, 110, and 112. The node 200 includes a processor 202 that is coupled to a memory 204. The memory 204 stores instructions for the processor 202, which, on execution, causes the processor 202 to perform desired operations. The processor 202 may be implemented based on a number of processor technologies known in the art. Some examples of the processor 202 may include, but are not limited to, an X86-based processor, a Reduced Instruction Set Computing (RISC) processor, an Application-Specific Integrated Circuit (ASIC) processor, a Complex Instruction Set Computing (CISC) processor, and the like. The memory 204 may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

In order to enable the node 200 to perform adaptive consensus in the distributed ledger network 100, the memory 204 includes a local copy of the shared ledger 206 in a database 208, an authentication unit 210, a creator node selection unit 214, a decentralization unit 216, a validation unit 218, and a new block creation unit 220. The local copy of the shared ledger 206 is periodically synced with the distributed ledger 114. Further, the node 200 includes a transceiver 212. The transceiver 212 includes suitable logic, circuitry, interfaces, and/or code that may be configured to receive the broadcasted transactions from other nodes (end user devices). Further, the transceiver 212 may be configured to broadcast a new verified block to the plurality of nodes for updating a local copy of the distributed ledger 114 associated with each of the plurality of nodes. The transceiver 212 may implement one or more known technologies to support wired or wireless communication with the distributed ledger network 100.

In some embodiments, one of the plurality of nodes in the distributed ledger network 100 may identify a selector node from the plurality of nodes within the distributed ledger network 100, based on a random selection algorithm. The creator node selection unit 214 may include suitable logic, circuitry, interfaces, and/or code that may be configured to adaptively select, by the selector node, a set of consensus nodes from the plurality of nodes to create a new unverified block. The new unverified block may include the one or more new transactions in the distributed ledger 114 based on a set of predefined node parameters. In an embodiment, the set of predefined node parameters may include, but are not limited to network capacity, compute power/hash rate, amount of crypto currency at stake, number of blocks previously generated, block size, amount of crypto currency locked/parked by the miner, and time required to create a new block. It may be noted that consideration of the set of predefined node parameters for the creator node selection unit 214 may address a situation of some specific creator taking control of the distributed ledger network 100.

Further, the creator node selection unit 214 may be configured to sample the plurality of nodes using a sampling technique based on the plurality of predefined node parameters. The sampling technique adaptively selects the set of consensus nodes within each category of the plurality of predefined node parameters to provide a decentralized consensus for creating the new verified block. Further, the creator node selection unit 214 may be configured to dynamically determine a number of nodes in the adaptively selected set of consensus nodes required for creating the new verified block based on volume of the one or more new transactions and the sampling.

The validation unit 218 may include suitable logic, circuitry, interfaces, and/or code that may be configured to perform consensus using the adaptively selected set of consensus nodes for identifying a set of valid transactions from the one or more new transactions. The validation unit 218 may be within each of the adaptively selected set of consensus nodes within the distributed ledger network 100. In an embodiment, a consensus node from the adaptively selected set of consensus nodes, which validates each of the one or more new transactions first, is authorized to create a new verified block in the distributed ledger 114. Further, the validation unit 218 may be configured to compute, by each of the adaptively selected set of consensus nodes, a hash value for each of the one or more new transactions. As will be appreciated, the hash value will be unique for each of the one or more transactions. In an embodiment, the hash value depends on a current transaction and the hash value of a previous transaction. For example, the hash value is obtained by applying a hashing algorithm to both the previous transaction and the current transaction. In an embodiment, a hashing algorithm may receive large range of values (such as all possible strings or all possible files) and map them onto a fixed smaller set of values (such as a 128 bit number, which is the hash value). Example, of such a hashing algorithm may include, but is not limited to, Secure Hashing Algorithm 256 (SHA-256).

Further, the validation unit 218 may be configured to validate each of the one or more new transactions based on the hash value, order of the one or more new transactions, and state of the one or more new transactions to identify the set of valid transactions from the one or more new transactions. In an embodiment, a consensus node is eligible to be included in the set adaptively selected consensus nodes, if a predefined time threshold has elapsed from the time the consensus node created its last verified block. In an embodiment, the consensus node may only create a pre-defined number of verified blocks within a predefined time interval.

The new block creation unit 220 may include suitable logic, circuitry, interfaces, and/or code that may be configured to create the new verified block in the distributed ledger 114, which may include the set of valid transactions. The new block creation unit 220 may be within a consensus node from the adaptively selected set of consensus nodes. The new block creation unit 220 in the consensus node from the adaptively selected set of consensus nodes may further be configured to commit, the set of valid transactions in the new verified block to the distributed ledger 114 based on the consensus. In an embodiment, an encrypted key is appended to each block when the consensus node creates the new verified block. It may be noted that the encrypted key may help in ensuring that the block was created by an authenticated/verified user and further ensure traceability.

Further, the distributed ledger network 100 may be capable of monitoring the crypto currency being parked by a computing node. A user of a node may block/park a plurality of crypto currency coins at a parking address monitored by the distributed ledger network 100. A stake of the node for being selected as a consensus node may increase based on a weighted average mechanism. The plurality of crypto currency coins parked at the parking address is not usable for performing any transactions, and a reward mechanism for such consensus node may be high. Further, the distributed ledger network 100 may reward the consensus node with crypto currency for successful creation of the new verified block. The authentication unit 210 may include suitable logic, circuitry, interfaces, and/or code that may be configured to verify/authenticate each of the plurality of nodes based on an encrypted key generated based on a Media Access Control address (MAC address) and a digital signature of the user operating the computing node.

The decentralization unit 216 may also include suitable logic, circuitry, interfaces, and/or code that may be configured to determine a predefined block threshold. It may be noted that the predefined block threshold may be a maximum number of blocks that a consensus node can create based on the compute power within a predefined time interval. In an embodiment, based on the predefined block threshold, a new consensus node may be included in the adaptively selected set of consensus nodes, when the adaptively selected set of consensus nodes is not able to create a new verified block within a second predefined time interval.

A stakeholder may interact with the node 200, via a User Interface (UI) 222. The UI 222 of the node 200 may be displayed on a display 224 of the node 200. The UI 222 may be used by the user to provide the one or more transactions to the node 200.

Figure 3:
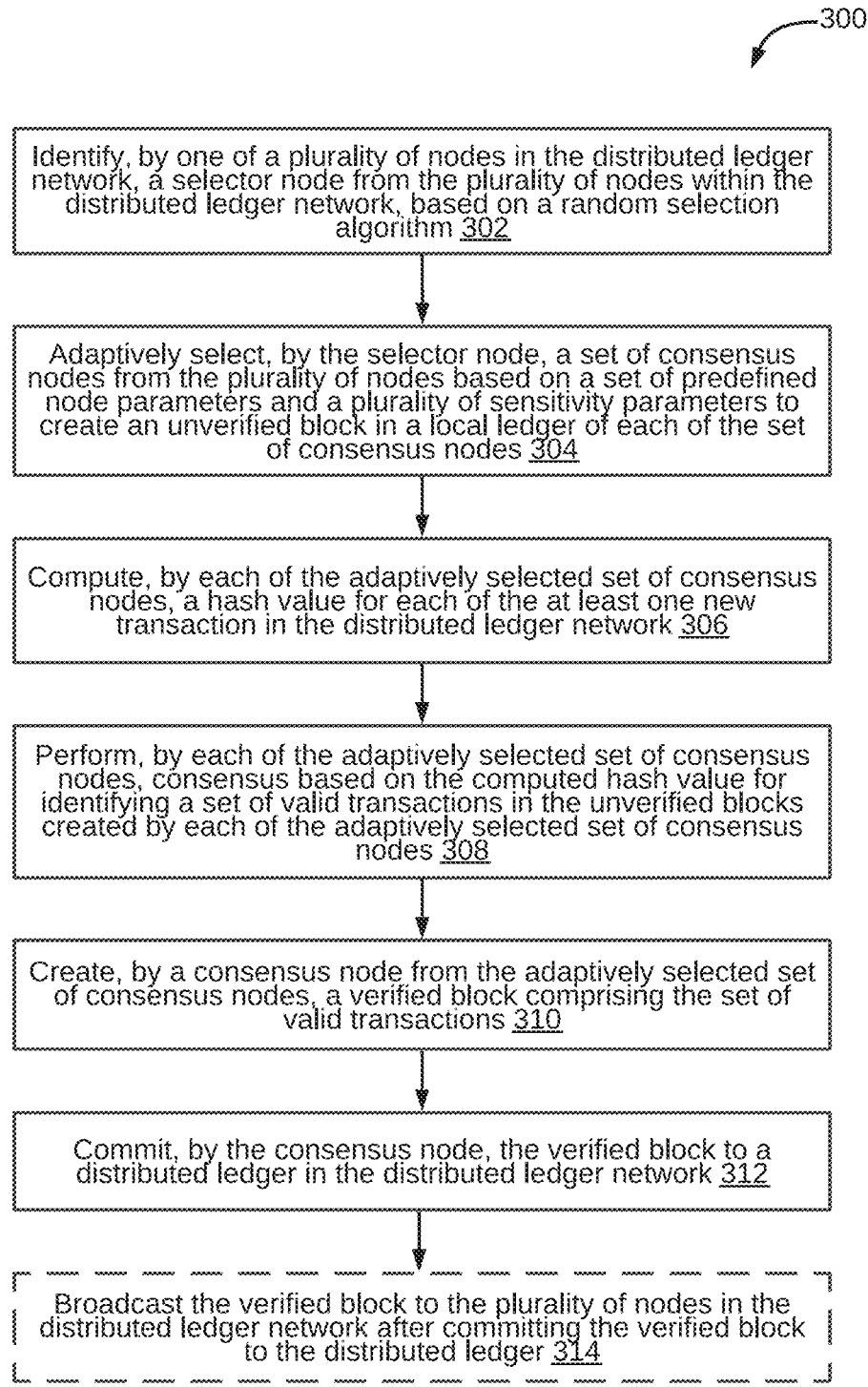
FIG. 3 illustrates a flowchart of a method for performing adaptive consensus in a distributed ledger network, in accordance with an embodiment.

Referring now to FIG. 3, a flowchart of a method 300 for performing adaptive consensus in a distributed ledger network is illustrated, in accordance with an embodiment. By way of an example, the distributed ledger network may be the distributed ledger network 100. One or more processor instructions stored in each of a plurality of nodes, enable the processor 202 to perform the method 300, based on information stored in a distributed ledger (for example, the ledger 114). The plurality of nodes, for example, may be the plurality of nodes 102, 104, 106, 108, 110, and 112. Prior to joining the distributed ledger network, each of a plurality of nodes are verified/authenticated based on an encrypted key generated based on the MAC address and a digital signature of the user operating each of the plurality of nodes. Each of the verified nodes is configured to receive the one or more new transactions. The one or more new transactions may include updating data within the distributed ledger stored in each of the plurality of nodes within the distributed ledger network. The one or more new transactions may be received from end user devices. Some examples of the one or more new transactions may include a financial transaction that the user wants to initiate, data received from IoT sensors, and the like. In an embodiment, multiple transactions received within a pre-defined time period (for example, 10 minutes) may be clubbed together to generate a block in the distributed ledger after validation.

At step 302, a selector node from a plurality of nodes within the distributed ledger network is identified by one of the plurality of nodes in the distributed ledger network, based on a random selection algorithm. In an embodiment, a SQL query may be used to randomly select the selector node. For example, SELECT RANDOM( ) function may be applied to the MAC address of all the plurality of nodes to randomly select the selector node. Further, at step 304, the selector node adaptively selects a set of consensus nodes from the plurality of nodes based on a set of predefined node parameters and a plurality of sensitivity parameters to create an unverified block in a local ledger of each of the adaptively selected set of consensus nodes. The unverified block may include at least one new transaction in the distributed ledger network. It may be noted that the set of predefined node parameters may include but are not limited to at least one of the total number of nodes in the distributed ledger network, a network capacity in the distributed ledger network, computing power of a node from the plurality of nodes, an amount of crypto currency at stake for the node, a number of verified blocks previously generated by the node, block size of a verified block created by the node, and an amount of crypto currency parked by the node.

At step 306, each of the adaptively selected set of consensus nodes computes a hash value for each of the at least one new transaction in the distributed ledger network. It may be noted that the hash value for a new transaction from the at least one new transaction is computed based on hash value of at least one preceding transaction. The at least one preceding transaction precedes the new transaction. For example, the hash value is obtained by applying a hashing algorithm to both the previous transaction and the current transaction. In an embodiment, a hashing algorithm may receive large range of values (such as all possible strings or all possible files) and map them onto a fixed smaller set of values (such as a 128 bit number, which is the hash value). Example, of such a hashing algorithm is Secure Hashing Algorithm 256 (SHA-256).

At step 308, each of the adaptively selected set of consensus nodes performs consensus based on the computed hash value for identifying a set of valid transactions in the unverified blocks created by each of the adaptively selected set of consensus nodes. The new transaction from the at least one new transaction may be validated, by a set of validator nodes, through validation of each of the computed hash value associated with the new transaction, order of the new transaction in the at least one new transaction, and state of the new transaction. In an embodiment, the set of validator nodes may be a subset of the adaptively selected set of consensus nodes or may be the same as that of the adaptively selected set of consensus nodes.

At step 310, a consensus node from the adaptively selected set of consensus nodes creates a verified block that includes the set of valid transactions. The consensus node identifies the set of valid transactions in a shortest time when compared with remaining consensus nodes in the adaptively selected set of consensus nodes. In an embodiment, a maximum number of blocks that a node can create based on the compute power within a predefined time interval may be determined. Based on the maximum number of blocks, the node may be included in the adaptively selected set of consensus nodes when each of the adaptively selected set of consensus nodes is not able to create the verified block within a predefined interval. Once the adaptively selected set of consensus nodes is identified, each of the adaptively selected set of consensus nodes creates the verified block, including the set of valid transactions, in the distributed ledger. This is further explained in detail in conjunction with FIG. 6.

During creation of the verified block, an encrypted key is appended to each block when the consensus node creates the verified block. It may be noted that the encrypted key may ensure that the verified block was created by an authenticated/verified user and further ensure traceability. In an embodiment, the encrypted key is dependent on the MAC address of the consensus node that creates the verified block and is created in two steps. In an embodiment, in a first step, the MAC address is encrypted by applying an unpredictable sequence of permutations to scramble the MAC address across a chunk. Further, in step two, an unpredictable sequence of permutations is used to create a new substitution box for each chunk of information. In an embodiment, one or more operations, such as transposition, rotation and the like may be performed on the permutations to create the encrypted key. A transposition is an operation that swaps two elements in a permutation. A rotation is an operation that rotates the elements in a permutation. Such a method of constructing a permutation is important because it prevents an intruder from trying to guess the permutation and thereby prevents tampering of the MAC address. Thus, the encrypted key ensures that the verified block was created by an authenticated/verified user and further ensures traceability.

Upon creation of the verified block, the system may reward the consensus node with crypto currency for successful creation of the verified block. At step 312, the consensus node commits the verified block to a distributed ledger in the distributed ledger network. The verified block is added to a local copy of the distributed ledger with the consensus node. Further, the local copy of the distributed ledger with the consensus node may be shared with the local copy of the distributed ledger with each of the plurality of nodes. At step 314, the verified block is broadcasted to the plurality of nodes in the distributed ledger network after committing the verified block to the distributed ledger.

Figure 4:
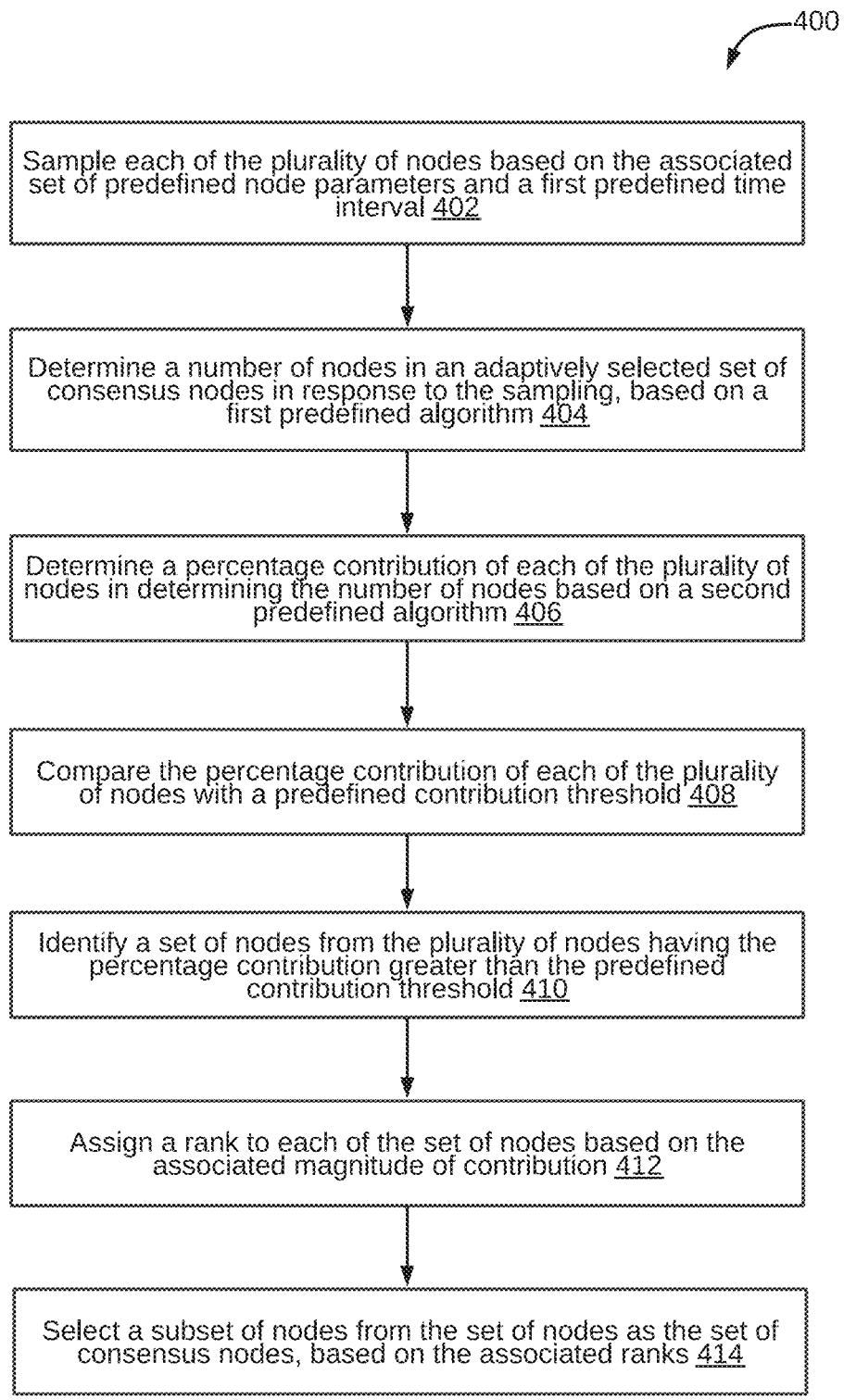
FIG. 4 illustrates a flowchart of a method for adaptively selecting a set of consensus nodes in a distributive ledger network, in accordance with an embodiment.

Referring now to FIG. 4, a flowchart of a method 400 for adaptively selecting a set of consensus nodes in a distributed ledger network is illustrated, in accordance with an embodiment. By way of an example, the distributed ledger network may be the distributed ledger network 100. One or more processor instructions stored in each of a plurality of nodes, enable the processor 202 to perform the method 400, based on information stored in the memory 204.

At step 402, each of the plurality of nodes is sampled based on the associated set of predefined node parameters and a first predefined time interval. By way of an example, the plurality of nodes may be the plurality of nodes 102, 104, 106, 108, 110, and 112. In an embodiment, sampling the plurality of nodes includes selecting the adaptively selected set of consensus nodes within each category of the associated set of predefined node parameters to provide a decentralized consensus for creating the new verified block.

At step 404, a number of nodes that should be included in the adaptively selected set of consensus nodes is determined in response to the sampling, based on a first predefined algorithm. The first predefined algorithm uses the set of predefined node parameters and the plurality of sensitivity parameters. It may be noted that the determined number of nodes are optimized based on a recursive adjustment of the plurality of sensitivity parameters. Further, the recursive adjustment is based on an analysis of the performance of the consensus in the distributed ledger network on the basis of a plurality of performance evaluation criteria. It may be noted that the set of predefined node parameters may include, but are not limited to, at least one of the total number of nodes in the distributed ledger network, a network capacity in the distributed ledger network, computing power of a node from the plurality of nodes, an amount of crypto currency at stake for the node, a number of verified blocks previously generated by the node, block size of a verified block created by the node, and an amount of crypto currency parked by the node.

In an embodiment, the number of nodes ($\omega$) in the adaptively selected set of consensus nodes may be determined using the equation (1) given below:

$$\omega = \frac{1}{\alpha}\left[\sum_{i=1}^{p}\left\{\frac{\log_{W1}\psi_i}{\log_{W2}\mu_i} * \sqrt[2]{\frac{\beta_i * \eta_i}{\theta_i}}\right\}\right] \quad (1)$$

wherein,

'$\omega$' is the number of nodes in the adaptively selected set of consensus nodes;

'$\alpha$' is the network capacity in the distributed ledger network;

'P' is the total number of nodes in the distributed ledger network;

'i' is an index of the node;

'$\psi$' is the amount of crypto currency parked by the node;

'$\mu$' is the amount of crypto currency at stake for the node;

'$\beta$' is the computing power of the node;

'$\eta$' is the number of verified blocks previously generated by the node; and

'$\Theta$' is the block size of a verified block created by the node.

It may be noted that in the equation (1), each of the plurality of nodes that have contributed to the one or more transactions in a tangible way is encouraged, by way of making the amount of crypto currency parked by the node directly proportional to the number of the adaptively selected set of consensus nodes to be selected. Further, by way of the equation (1) mere betting of crypto currency by way of making the amount of crypto currency at stake inversely proportional to the number of the adaptively selected set of consensus nodes to be selected is discouraged. Further, as the betting of the crypto currency is increased, selection of the adaptively selected set of consensus nodes becomes more rigid or cautious. Therefore, through the equation (1), it is ensured that each of the plurality of nodes with only a high amount of crypto currency at stake may not control the distributed ledger network without performing tangible transactions or a proportionately high amount of crypto currency parked.

Further, in the equation (1), the weights 'W1' and 'W2' form the plurality of sensitivity parameters which may be recursively adjusted based on an emphasis to be given to the set of predefined node parameters relating to the amount of crypto currency at stake for the node or the amount of crypto currency parked by the node. Further, the equation (1) ensures that importance given to the set of predefined node parameters relating to the amount of crypto currency at stake for the node or the amount of crypto currency parked by the node is less compared to importance given to other set of predefined node parameters. Effect of the set of predefined node parameters relating to the amount of crypto currency at stake for the node or the amount of crypto currency parked by the node tapers off after a point or has a lesser influence on calculations compared to the other set of predefined node parameters.

Once the number of the adaptively selected set of consensus nodes is identified, the system identifies which of the plurality of nodes may be a part of the adaptively selected set of consensus nodes. At step 406, a percentage contribution of each of the plurality of nodes in determining the number of nodes is determined based on a second predefined algorithm. The second predefined algorithm uses a plurality of node parameters selected from the set of predefined node parameters and the plurality of sensitivity parameters. By way of an example, the second predefined algorithm may be represented by equation (2) given below:

$$\text{percentage contribution} = \left\{ \frac{\log_{W1}\psi_i}{\log_{W2}\mu_i} * \sqrt[2]{\frac{\beta_i * \eta_i}{\theta_i}} \right\} \quad (2)$$

At step 408, the percentage contribution of each of the plurality of nodes is compared with a predefined contribution threshold. At step 410, a set of nodes from the plurality of nodes having the percentage contribution greater than the predefined contribution threshold is identified. At step 412, a rank is assigned to each of the set of nodes based on the associated magnitude of contribution. The highest rank is assigned to a node having the highest magnitude of contribution. At step 414, a subset of nodes is selected from the set of nodes as the adaptively selected set of consensus nodes, based on the associated ranks. Rank of each node in the subset of nodes is less than or equal to the number of nodes in the adaptively selected set of consensus nodes.

By way of an example, in a distributed ledger network with a total of 100 nodes ('P=100 nodes) and a network capacity of 10 TB/s ($\alpha$=10 TB/s), a node with index "i" includes the following set of predefined node parameters:

$\beta_i$=2MH/s
$\mu_i$=10 BTC
$\eta_i$=5
$\theta_i$=1 MB
$\psi_i$=50 BTC

Further, in the distributed ledger network, each of the 100 nodes has an identical set of predefined node parameters as node "i". Upon solving the equation (1) for the distributed ledger network, the number of the adaptively selected set of consensus nodes is 53.72 (~54 when rounded off). Assuming each of the 100 nodes is identical (which may not be the case in a real-life scenario), any 54 nodes may be selected from the 100 nodes. As will be appreciated, conventional consensus systems require each of the 100 nodes to be a part of the adaptively selected set of consensus nodes and computing resources of other 46 nodes are wasted. Therefore, when the disclosed adaptive consensus algorithm is used in a distributed ledger network, there is an optimal utilization of the computing resources. Further, only the 54 adaptively selected set of consensus nodes may compute the hash value for each of the at least one new transaction in the distributed ledger network, reducing wastage of computing resources and achieving the consensus in a secure and in a decentralized manner.

As there is restriction on when each of the plurality of nodes may be included in the adaptively selected set of consensus nodes, decentralization is maintained over a period of time and hence, situations where only a specific adaptively selected set of consensus nodes control the consensus in the distributed ledger network are avoided. Further, in an embodiment, a user of a node may park a plurality of crypto currency coins at a parking address that is being monitored. The stake of the node for being selected in the adaptively selected set of consensus nodes may increase based on a weighted average mechanism. The crypto currency coins parked at the parking address are not usable for performing any transactions, and the reward mechanism for such a consensus node may be high.

Figure 5:
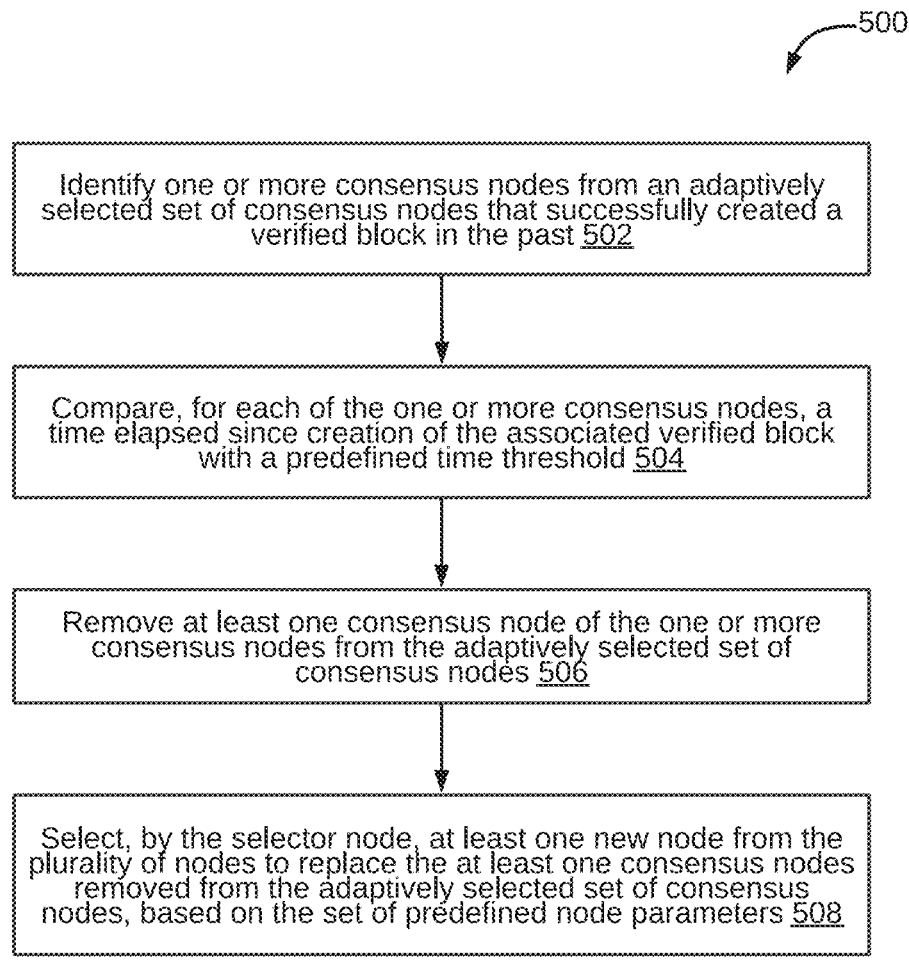
FIG. 5 illustrates a flowchart of a method for replacing at least one consensus node with at least one new node, in accordance with an embodiment.

Referring now to FIG. 5, a flowchart of a method 500 for replacing at least one consensus node with at least one new node is illustrated, in accordance with an embodiment. One or more processor instructions stored in each of a plurality of nodes, enable the processor 202 to perform the method 500, based on information stored in the memory 204. At step 502, one or more consensus nodes from the adaptively selected set of consensus nodes that successfully created a verified block in the past are identified. At step 504, for each of the one or more consensus nodes, a time elapsed since creation of the associated verified block is compared with a predefined time threshold. At step 506, at least one consensus node of the one or more consensus nodes is removed from the adaptively selected set of consensus nodes. The time elapsed for each of the at least one consensus node is less than the predefined time threshold. At step 508, the selector node selects at least one new node from the plurality of nodes to replace the at least one consensus nodes removed from the adaptively selected set of consensus nodes, based on the set of predefined node parameters. This has already been explained in detail in conjunction with FIG. 3 and FIG. 4.

Figure 6:
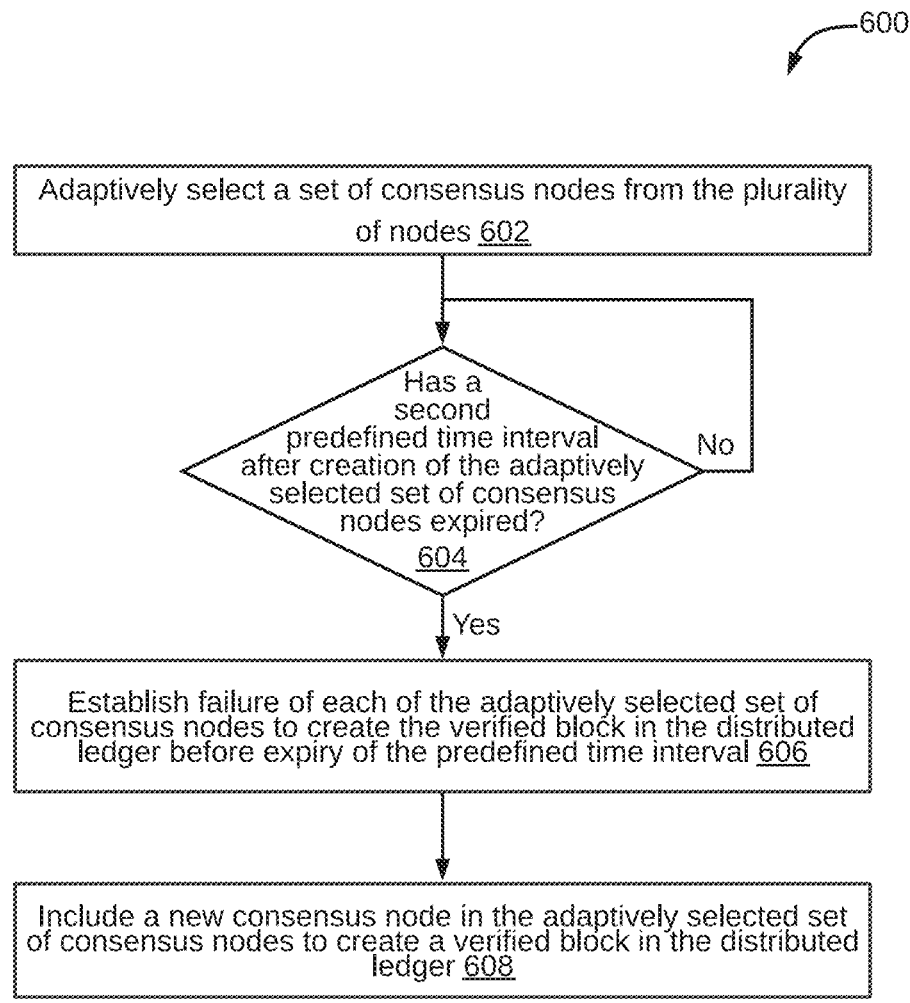
FIG. 6 illustrates a flowchart of a method for including a new consensus node in an adaptively selected set of consensus nodes to create a verified block in a distributed ledger, in accordance with an embodiment.

Referring now to FIG. 6, a flowchart of a method 600 for including a new consensus node in an adaptively selected set of consensus nodes to create a verified block in the distributed ledger is illustrated, in accordance with an embodiment. At step 602, a set of consensus nodes is adaptively selected from the plurality of nodes. At step 604, a check is performed to determine whether after creation of the adaptively selected set of consensus nodes, a second predefined time period has expired or not. If the second predefined time period has expired, at step 606, failure of each of the adaptively selected set of consensus nodes to create the verified block in the distributed ledger is established before expiry of the second predefined time interval is established. At step 608, a new consensus node is included in the adaptively selected set of consensus nodes to create a verified block in the distributed ledger. The new consensus node is selected for inclusion, such that, the compute power of the new consensus node is above a predefined power threshold. Additionally, a number of verified blocks already created by the new consensus node is below a predefined block threshold. The new consensus node is selected from the plurality of nodes.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for performing adaptive consensus in a distributed ledger network. The invention provides for unbiased (fair) leader node selection and minimizing computational resource wastage. A selector node is randomly selected from a plurality of nodes in the distributive ledger network. The selector node adaptively selects a set of consensus nodes based on a set of predefined node parameters and a plurality of sensitivity parameters. The adaptively selected set of consensus nodes perform a consensus to check a validity of one or more transactions. A consensus node from the adaptively selected set of consensus nodes creates a verified block including a set of valid transactions. Further, the verified block is committed to a distributed ledger in the distributed ledger network.

The disclosed claimed limitations and the disclosure provided herein provides a mechanism for appropriate consensus mechanism that is able to ensure an unbiased (fair) consensus node selection in a complex distributed ledger network, while minimizing resource wastage. The disclosed claimed limitations solve the technical problem of bias involved in consensus node selection which led to centralization of the distributed ledger network and further resource wastage issues in consensus node selection are also being addressed.

In order to ensure unbiased selection of consensus nodes the claimed limitations adaptively select a set of consensus nodes based on a set of predefined node parameters and a plurality of sensitivity parameters. Further, in order to reduce computational resource wastage, the claimed limitations perform consensus only with reduced number of selected set of consensus nodes that are identified based on the sampling, the first equation and the second equation. As illustrated above, the disclosed method and system at least avoids resource wastage by 50%. Additionally, the disclosed method and system provides an adaptive consensus mechanism that avoids the risk of a DDOS attack and Sybil attack. Further, there is less opportunity for a 51% attack. Further, because of the adaptive consensus technique decentralization is maintained over a long period of time as well. Additionally, the disclosed method and system ensures a decentralized and democratic distributed ledger network, which has low latency, low processing power requirements, low network energy, and provides frictionless and guaranteed transaction processing and block creation.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described a method and system for performing adaptive consensus in a distributed ledger network. The illustrated steps are set out to explain the exemplary embodiments shown, and it should be anticipated that ongoing technological development will change the way functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure may not be limited to the particular embodiment disclosed, but that the present disclosure will include all embodiments falling within the scope of the appended claims.

It is intended that the disclosure and examples be considered as exemplary only, with a true scope and spirit of disclosed embodiments being indicated by the following claims.

What is claimed is:

1. A method for performing adaptive consensus in a distributed ledger network, the method comprising:
    identifying, by one of a plurality of nodes in the distributed ledger network, a selector node from the plurality of nodes within the distributed ledger network, based on a random selection algorithm;
    adaptively selecting, by the selector node, a set of consensus nodes from the plurality of nodes based on a set of predefined node parameters and a plurality of sensitivity parameters to create an unverified block in a local ledger of each of the adaptively selected set of consensus nodes, wherein the unverified block comprises at least one new transaction in the distributed ledger network;
    computing, by each of the adaptively selected set of consensus nodes, a hash value for each of the at least one new transaction in the distributed ledger network;
    performing, by each of the adaptively selected set of consensus nodes, consensus based on the computed hash value for identifying a set of valid transactions in the unverified blocks created by each of the adaptively selected set of consensus nodes;
    creating, by a consensus node from the adaptively selected set of consensus nodes, a verified block comprising the set of valid transactions, wherein the consensus node identifies the set of valid transactions in a shortest time when compared with remaining consensus nodes in the adaptively selected set of consensus nodes, wherein creating the verified block comprises:
        encrypting, by the consensus node, a MAC address of the consensus node based on an application of an unpredictable sequence of permutations;
        creating, by the consensus node, a new substitution box for the verified block based on an unpredictable sequence of permutations;
        determining, by the consensus node, an encryption key based on one or more operations on the new substitution box and the encrypted MAC address; and
        appending, by the consensus node, the encryption key to the verified block; and
    committing, by the consensus node, the verified block to a distributed ledger in the distributed ledger network.

2. The method of claim 1, wherein adaptively selecting the adaptively selected set of consensus nodes comprises:
    sampling each of the plurality of nodes based on the associated set of predefined node parameters and a first predefined time interval; and
    determining a number of nodes in the adaptively selected set of consensus nodes in response to the sampling, based on a first predefined algorithm, wherein the first predefined algorithm uses the set of predefined node parameters and the plurality of sensitivity parameters.

3. The method of claim 2, wherein the determined number of nodes are optimized based on a recursive adjustment of the plurality of sensitivity parameters, wherein the recursive adjustment is based on an analysis of the performance of the consensus in the distributed ledger network on the basis of a plurality of performance evaluation criteria.

4. The method of claim 2, further comprising:
    determining a percentage contribution of each of the plurality of nodes in determining the number of nodes based on a second predefined algorithm, wherein the second predefined algorithm uses a plurality of node parameters selected from the set of predefined node parameters and the plurality of sensitivity parameters;
    comparing the percentage contribution of each of the plurality of nodes with a predefined contribution threshold; and
    identifying a set of nodes from the plurality of nodes having the percentage contribution greater than the predefined contribution threshold.

5. The method of claim 4, further comprising:
    assigning a rank to each of the set of nodes based on the associated magnitude of contribution, wherein the highest rank is assigned to a node having the highest magnitude of contribution; and
    selecting a subset of nodes from the set of nodes as the adaptively selected set of consensus nodes, based on the associated ranks, wherein rank of each node in the subset of nodes is less than or equal to the number of nodes in the adaptively selected set of consensus nodes.

6. The method of claim 1, wherein adaptively selecting the adaptively selected set of consensus nodes comprises:

identifying one or more consensus nodes from the adaptively selected set of consensus nodes that successfully created a verified block in the past;

comparing, for each of the one or more consensus nodes, a time elapsed since creation of the associated verified block with a predefined time threshold; and removing at least one consensus node of the one or more consensus nodes from the adaptively selected set of consensus nodes, wherein the time elapsed for each of the at least one consensus node is less than the predefined time threshold.

7. The method of claim 6, further comprising selecting, by the selector node, at least one new node from the plurality of nodes to replace the at least one consensus nodes removed from the adaptively selected set of consensus nodes, based on the set of predefined node parameters.

8. The method of claim 1, wherein the hash value for a new transaction from the at least one new transaction is computed based on hash value of at least one preceding transaction, wherein the at least one preceding transaction precedes the new transaction.

9. The method of claim 8, further comprising validating the new transaction from the at least one new transaction through validation of each of the computed hash value associated with the new transaction, order of the new transaction in the at least one new transaction, and state of the new transaction.

10. The method of claim 1 further comprises broadcasting the verified block to the plurality of nodes in the distributed ledger network after committing the verified block to the distributed ledger.

11. The method of claim 1, wherein the set of predefined node parameters comprises at least one of the total number of nodes in the distributed ledger network, a network capacity in the distributed ledger network, computing power of a node from the plurality of nodes, an amount of crypto currency at stake for the node, a number of verified blocks previously generated by the node, block size of a verified block created by the node, and an amount of crypto currency parked by the node.

12. The method of claim 1, further comprising:
determining expiry of a second predefined time interval after creation of the adaptively selected set of consensus nodes;
establishing failure of each of the adaptively selected set of consensus nodes to create the verified block in the distributed ledger before expiry of the second predefined time interval; and
including a new consensus node in the adaptively selected set of consensus nodes to create a verified block in the distributed ledger, wherein the compute power of the new consensus node is above a predefined power threshold, and wherein a number of verified blocks already created by the new consensus node is below a predefined block threshold, wherein the new consensus node is selected from the plurality of nodes.

13. A system for performing adaptive consensus in a distributed ledger network, the system comprising:
a processor; and
a computer-readable medium communicatively coupled to the processor, wherein the computer-readable medium stores processor-executable instructions, which when executed by the processor, cause the processor to:
identify, by one of a plurality of nodes in the distributed ledger network, a selector node from the plurality of nodes within the distributed ledger network, based on a random selection algorithm;
adaptively select, by the selector node, a set of consensus nodes from the plurality of nodes based on a set of predefined node parameters and a plurality of sensitivity parameters to create an unverified block in a local ledger of each of the adaptively selected set of consensus nodes, wherein the unverified block comprises at least one new transaction in the distributed ledger network;
compute, by each of the adaptively selected set of consensus nodes, a hash value for each of the at least one new transaction in the distributed ledger network;
perform, by each of the adaptively selected set of consensus nodes, consensus based on the computed hash value for identifying a set of valid transactions in the unverified blocks created by each of the adaptively selected set of consensus nodes;
create, by a the consensus node from the adaptively selected set of consensus nodes, a verified block comprising the set of valid transactions, wherein the consensus node identifies the set of valid transactions in a shortest time when compared with remaining consensus nodes in the adaptively selected set of consensus nodes, wherein creating the verified block comprises:
encrypting, by the consensus node, a MAC address of the consensus node based on an application of an unpredictable sequence of permutations;
creating, by a consensus node, a new substitution box for the verified block based on an unpredictable sequence of permutations;
determining, by the consensus node, an encryption key based on one or more operations on the new substitution box and the encrypted MAC address; and
appending, by the consensus node, the encryption key to the verified block; and
commit, by the consensus node, the verified block to a distributed ledger in the distributed ledger network.

14. The system of claim 13, wherein to adaptively select the adaptively selected set of consensus nodes, the processor-executable instructions, on execution, further cause the processor to:
sample each of the plurality of nodes based on the associated set of predefined node parameters and a first predefined time interval; and
determine a number of nodes in the adaptively selected set of consensus nodes in response to the sampling, based on a first predefined algorithm, wherein the first predefined algorithm uses the set of predefined node parameters and the plurality of sensitivity parameters.

15. The system of claim 14, wherein the processor-executable instructions, on execution, further cause the processor to:
determine a percentage contribution of each of the plurality of nodes in determining the number of nodes based on a second predefined algorithm, wherein the second predefined algorithm uses a plurality of node parameters selected from the set of predefined node parameters and the plurality of sensitivity parameters;
compare the percentage contribution of each of the plurality of nodes with a predefined contribution threshold; and
identify a set of nodes from the plurality of nodes having the percentage contribution greater than the predefined contribution threshold.

16. The system of claim 15, wherein the processor-executable instructions, on execution, further cause the processor to:
assign a rank to each of the set of nodes based on the associated magnitude of contribution, wherein the highest rank is assigned to a node having the highest magnitude of contribution; and
select a subset of nodes from the set of nodes as the adaptively selected set of consensus nodes, based on the associated ranks, wherein rank of each node in the subset of nodes is less than or equal to the number of nodes in the adaptively selected set of consensus nodes.

17. The system of claim 13, wherein to adaptively select the adaptively selected set of consensus nodes, the processor-executable instructions, on execution, further cause the processor to:
identify one or more consensus nodes from the adaptively selected set of consensus nodes that successfully created a verified block in the past;
compare, for each of the one or more consensus nodes, a time elapsed since creation of the associated verified block with a predefined time threshold; and
remove at least one consensus node of the one or more consensus nodes from the adaptively selected set of consensus nodes, wherein the time elapsed for each of the at least one consensus node is less than the predefined time threshold.

18. The system of claim 13, wherein the hash value for a new transaction from the at least one new transaction is computed based on hash value of at least one preceding transaction, wherein the at least one preceding transaction precedes the new transaction.

19. The system of claim 18, wherein the processor-executable instructions, on execution, further cause the processor to validate the new transaction from the at least one new transaction through validation of each of the computed hash value associated with the new transaction, order of the new transaction in the at least one new transaction, and state of the new transaction.

20. A non-transitory computer-readable medium storing computer-executable instructions for performing adaptive consensus in a distributed ledger network, the computer-executable instructions configured for:
identifying, by one of a plurality of nodes in the distributed ledger network, a selector node from the plurality of nodes within the distributed ledger network, based on a random selection algorithm;
adaptively selecting, by the selector node, a set of consensus nodes from the plurality of nodes based on a set of predefined node parameters and a plurality of sensitivity parameters to create an unverified block in a local ledger of each of the adaptively selected set of consensus nodes, wherein the unverified block comprises at least one new transaction in the distributed ledger network;
computing, by each of the adaptively selected set of consensus nodes, a hash value for each of the at least one new transaction in the distributed ledger network;
performing, by each of the adaptively selected set of consensus nodes, consensus based on the computed hash value for identifying a set of valid transactions in the unverified blocks created by each of the adaptively selected set of consensus nodes;
creating, by a consensus node from the adaptively selected set of consensus nodes, a verified block comprising the set of valid transactions, wherein the consensus node identifies the set of valid transactions in a shortest time when compared with remaining consensus nodes in the adaptively selected set of consensus nodes, wherein creating the verified block comprises:
encrypting, by the consensus node, a MAC address of the consensus node based on an application of an unpredictable sequence of permutations;
creating, by the consensus node, a new substitution box for the verified block based on an unpredictable sequence of permutations;
determining, by the consensus node, an encryption key based on one or more operations on the new substitution box and the encrypted MAC address; and
appending, by the consensus node, the encryption key to the verified block; and
committing, by the consensus node, the verified block to a distributed ledger in the distributed ledger network.

* * * * *